United States Patent [19]
Hass

[11] Patent Number: 5,961,406
[45] Date of Patent: Oct. 5, 1999

[54] BALL TOY AND METHOD FOR MAKING SAME

[76] Inventor: Peter McL. Hass, 286 Markham Ave., Vacaville, Calif. 95688

[21] Appl. No.: 09/044,438

[22] Filed: Mar. 19, 1998

[51] Int. Cl.[6] .............................. A63B 43/02; A01K 15/00
[52] U.S. Cl. ............................................. 473/576; 119/707
[58] Field of Search ................................... 473/575, 576, 473/596, 597, 614; 119/707, 708, 709; D21/707, 713; D30/160

[56] References Cited

U.S. PATENT DOCUMENTS

| | | | |
|---|---|---|---|
| D. 58,234 | 6/1921 | Holley | D21/707 |
| D. 328,805 | 8/1992 | O'Rourke | D30/160 |
| D. 330,100 | 10/1992 | O'Rourke | D30/160 |
| D. 330,614 | 10/1992 | O'Rourke . | |
| D. 343,930 | 2/1994 | Garcia . | |
| D. 356,354 | 3/1995 | Killion . | |
| D. 358,911 | 5/1995 | Hotta . | |
| D. 359,147 | 6/1995 | Hotta . | |
| D. 359,600 | 6/1995 | Hotta . | |
| 2,809,863 | 10/1957 | Curran | 299/24 |
| 3,693,972 | 9/1972 | Minchin | 473/575 |
| 4,088,319 | 5/1978 | Clarke | 473/575 |
| 4,127,268 | 11/1978 | Lindgren . | |
| 4,321,888 | 3/1982 | Topliffe . | |
| 4,657,253 | 4/1987 | Lerner . | |
| 4,884,807 | 12/1989 | Welch . | |
| 4,924,811 | 5/1990 | Axelrod . | |
| 5,092,272 | 3/1992 | O'Rourke | 119/707 |
| 5,230,682 | 7/1993 | Myers | 473/576 |
| 5,265,559 | 11/1993 | Borell | 119/707 |
| 5,282,777 | 2/1994 | Myers | 473/576 |
| 5,467,740 | 11/1995 | Redwine . | |

*Primary Examiner*—Steven Wong
*Attorney, Agent, or Firm*—Finley & Berg, LLP

[57] ABSTRACT

A ball toy for dogs is provided comprising a ball and a handle. The ball has a hollow interior cavity and an outer surface defining at least two openings into said hollow interior cavity. The handle has two ends, one of which is inserted into one of the openings in the outer surface of the ball, and the other of which is inserted into the other opening in the outer surface of the ball. The two ends of the handle are fixed together at a joinder point making the handle a continuous loop.

11 Claims, 3 Drawing Sheets

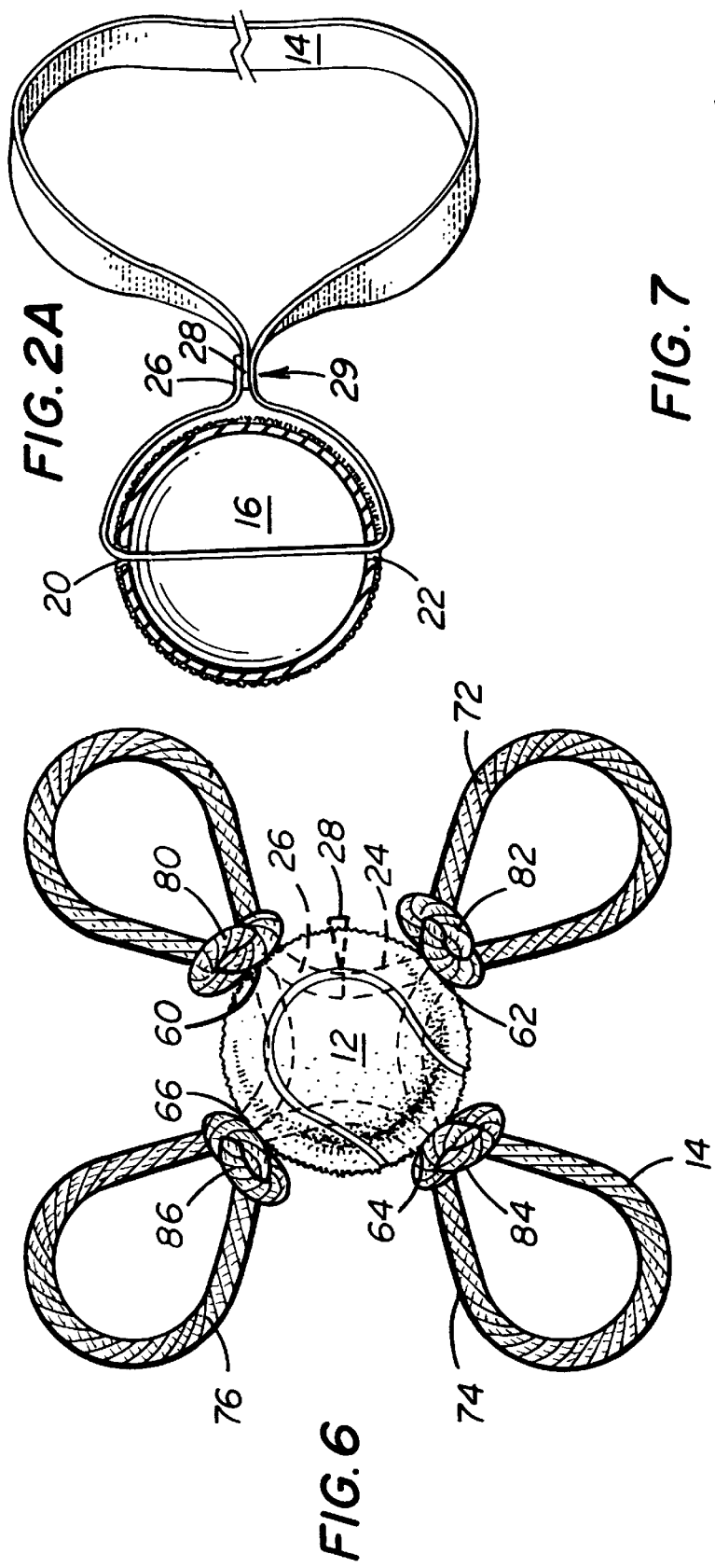

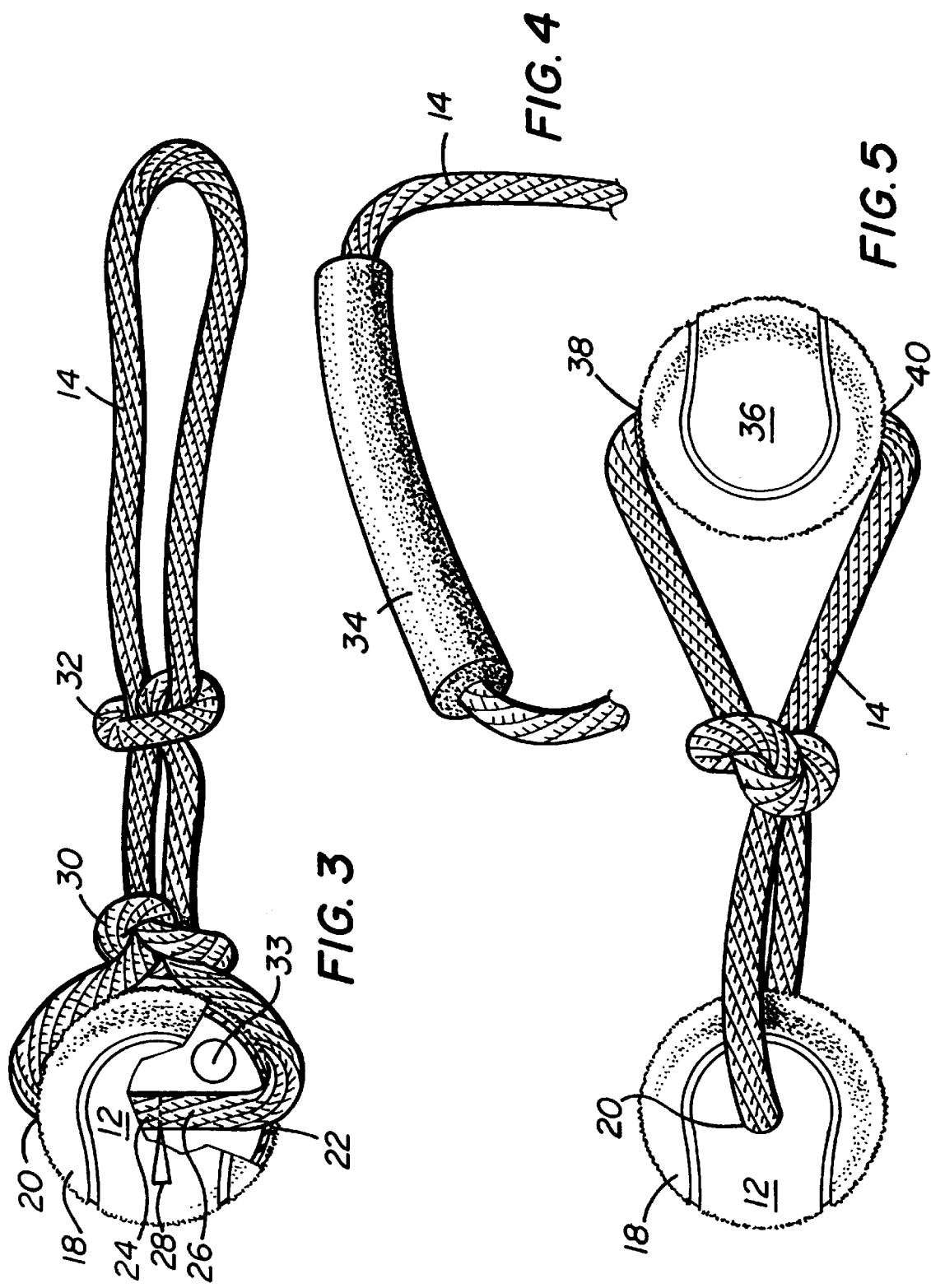

BALL TOY AND METHOD FOR MAKING SAME

FIELD OF THE INVENTION

This invention relates in general to toys for pets or children and, more particularly, to a ball toy having a looped handle passing through it.

BACKGROUND OF THE INVENTION

Ball toys provide a means for enjoyment and exercise for pets such as dogs and owners alike. However, after a pet's extended play with a ball, the ball may be soaked with saliva. Understandably, the pet owner is not enthused over having to retrieve and carry about a saliva-soaked ball. Pet owners, accordingly, will prefer a ball toy which features a strap or handle attached to the ball. The strap provides greater leverage for throwing the ball, and further allows the owner to reclaim and hold the ball toy without having to contact the wet ball.

The ball toy may also be used as a child's toy, with the strap providing a convenient carrying handle and allowing the child to throw the ball further than the child would be able to unassisted.

However, pets have strong jaws and an instinct to pull upon and chew their toys, and children often alter accessible parts of toys while investigating them. A common problem with ball toys having handles arises when the handle is not sufficiently well secured to the ball and is pulled apart from the ball toy. For example, where a strap is attached to a ball by fixing one end of the strap within the ball, the strap will be pulled out of the ball if either of two common phenomena occur: if the means used to hold the strap end inside the ball deteriorates (e.g., a knot comes undone), or if the hole through which the strap end is inserted into the ball is enlarged by movement of the strap in relation to the ball.

The present invention has been developed to provide a ball toy having a sturdy handle suitable for carrying and throwing the ball toy which will remain fixed to the ball toy even when considerable force is used to pull the handle away from the ball toy.

An object of the present invention is to provide a ball toy having a looped handle entering and exiting the ball through different openings at least once.

A further object of the present invention is to position the joinder point of the looped handle within the interior of the ball so that pets will not chew upon the joinder point and damage the handle.

Another object of the present invention is to identify a method for making the inventive ball toy.

Other objects and advantages of the present invention will become apparent when the ball toy of the present invention is considered in conjunction with the accompanying drawings, specification, and claims.

SUMMARY OF THE INVENTION

A ball toy for pets or people is provided comprising a ball and a handle. The ball has a hollow interior cavity and an outer surface defining at least two openings into said hollow interior cavity. The handle has two ends, one of which is inserted into one of the openings in the outer surface of the ball, and the other of which is inserted into the other opening in the outer surface of the ball. The two ends of the handle are fixed together at a joinder point making the handle a continuous loop.

BRIEF DESCRIPTION OF THE DRAWINGS

FIG. 2A shows a horizontal cross section of an embodiment of the ball toy wherein the two ends of the handle are joined within the interior hollow cavity of the ball.

FIG. 3 depicts a top plan view of an embodiment of the inventive ball toy which has been partially cut away to show the interior of the ball.

FIG. 4 depicts an embodiment of the handle for the inventive ball toy comprising a foam grip fitted over the rope handle of FIG. 3.

FIG. 5 depicts an embodiment of the inventive ball toy comprising two balls attached to a single handle.

FIG. 6 depicts a top plan view of an embodiment of the inventive ball toy wherein the handle of the toy enters and exits the interior of the ball from four different openings, and is formed into a loop extending away from each of the openings. The handle is shown passing through the interior of the ball in phantom.

FIG. 7 depicts a top plan view of an embodiment of the inventive ball toy having two nearly adjoining balls wherein the handle is formed into a loop at either side of the nearly adjoining balls. The handle is shown passing through the interior of each ball in phantom.

DESCRIPTION OF THE PREFERRED EMBODIMENT

Figure 1:
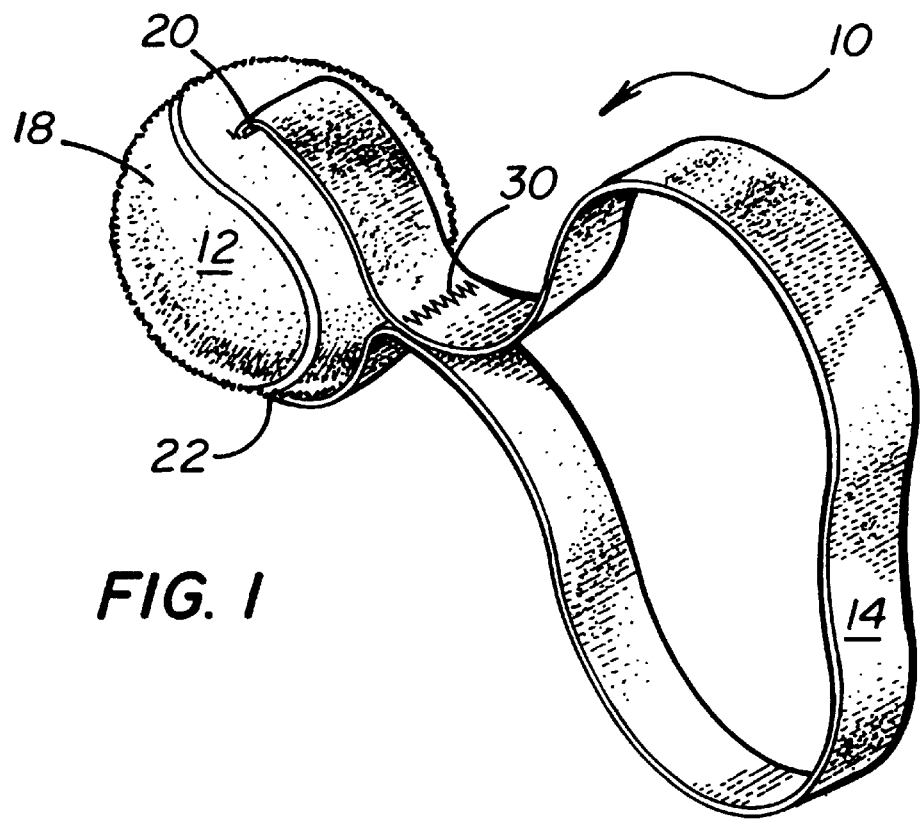
FIG. 1 depicts a top plan view of a preferred embodiment of the inventive ball toy featuring a strap handle.
Figure 2:
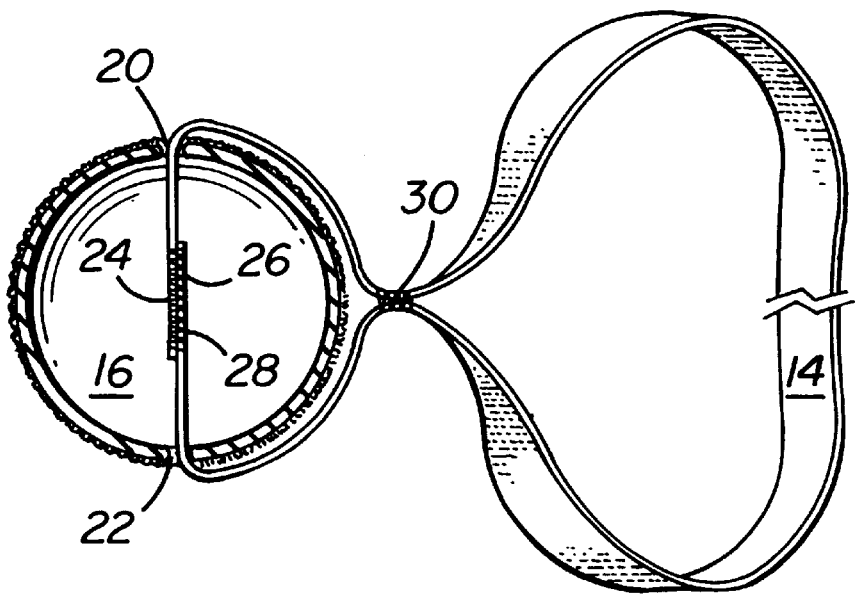
FIG. 2 shows a horizontal cross section of the ball toy of FIG. 1 taken at section line 2—2.

Referring to FIG. 1, a preferred embodiment 10 of the inventive ball toy for pets or people is shown which comprises a ball 12 and a handle 14. Referring to FIG. 2, ball 12 has a hollow interior cavity 16 and an exterior surface 18 which defines at least two openings 20 and 22 into hollow interior cavity 16. Handle 14 passes through hollow interior cavity 16, entering hollow interior cavity 16 through one opening 20 and exiting hollow interior cavity 16 through another opening 22. Handle 14 has two ends 24 and 26 which are fixed together at a joinder point 28 such that handle 14 is formed into a loop.

As handle 14 is formed into a loop which passes through ball 12, it cannot be pulled out of ball 12 unless handle 12, joinder point 28, or ball 12 is destroyed. The looped nature of handle 14 additionally adds to a user's ease in handling the inventive toy and provides a firm grip on the toy for the user who wishes to play tug-of-war with a pet or with another user.

Joinder point 28 for handle 14 is preferably placed within the hollow interior 16 of ball 12. This reduces the risk that handle 14 will break apart at joinder point 28, as a pet or a child playing with the inventive toy cannot worry at the joinder point 28. Additionally, by hiding joinder point 28, the exposed portion of handle 14 can be made into a streamlined surface.

Referring to FIG. 2A, in an alternate embodiment of the inventive ball toy, ends 24 and 26 are sewn to each other and back to handle 14 at a joinder point 29 which is made exterior to ball 12, preferably just outside exterior surface 18. This forms two loops in handle 14: one passing through ball 12, and one exterior to ball 12 which is convenient for a user's grip. Joinder point 29 can be strongly reinforced, as by sewing, to prevent it from coming apart.

Ball 12 may be a tennis ball, as shown. However, it should be understood that ball 12 can be any ball forming a hollow interior cavity and two openings into the cavity. The hollow interior cavity need not be spherical, as shown, but must simply provide space for the passage of handle 14 and joined ends 24 and 26. openings 20 and 22 into hollow interior cavity 16 can have any shape, but preferably are sized just large enough to accommodate the passage of handle 14 through them while allowing joinder point 28 to pass therethrough. Minimizing the size of openings 24 and 26 helps to reduce movement of handle 14 in relation to ball 12, and maintains the structural strength of ball 12.

A second joinder point 30 may be made in handle 14 outside ball 12 to further reduce movement of handle 14 in relation to ball 12. Further joinder points may be made in handle 14 if desired.

A preferred method of making the inventive dog toy is described as follows. Two openings 20 and 22 are formed in the outer surface of a ball 12 having a hollow interior cavity 16. The openings 20 and 22 are sufficiently large such that two ends 24 and 26 of a handle 14 which have been fixed together can pass through each of them. A handle 14 having two ends 24 and 26 is fitted through the hollow ball 12 by inserting one end of the handle 14 through one of the two openings into the hollow interior cavity 16 of the ball 12 and pulling that end through the other of the two openings. The two ends of the handle 24 and 26 are then fixed together exterior to the ball, thereby forming the handle 14 into a loop. The handle 14 is then pulled through the ball 12 until the two joined ends 24 and 26 of the handle 14 are positioned within the hollow interior cavity 16 of the ball 12. Portions of the handle may then be further joined together at one or more positions 30 exterior to the ball.

It should be understood that a rigid threading device such as a bolt, blade, needle or shuttle may be utilized to pull the one end of the handle through the ball. For example, one method of threading the handle constitutes sliding a rigid metal bolt defining a hole in one end through the hollow interior of the ball, such that the bolt extends through both openings formed in the ball's outer surface. The handle is then passed through the hole in the end of the bolt. To thread the handle through the ball, the ball is pulled off of the rigid metal bolt, thereby pulling the doubled-over handle through the ball. One end of the handle may then be pulled the rest of the way through the ball. The rigid metal bolt may be fixed in place (e.g. mounted into a workbench) to facilitate this process. A kick press or hydraulic press may be used to drive the rigid metal bolt through the interior of the ball.

It should be understood, however, that other methods can be used to make the inventive ball toy. For example, the two ends of the handle can be fixed together, forming the joinder point, before the handle is inserted into a ball. A ball can then be constructed around the handle such that the joinder point is enclosed within the ball. As another example, the step of forming the two openings in the ball may be combined with the step of pulling the handle through the interior of the ball. A rigid metal blade having a hole in one sharpened end has the handle threaded through the hole. The sharpened end of the blade is then punched through the ball, both forming the two openings into the interior of the ball and pulling the handle through both openings. The handle is then pulled out of the hole in the rigid metal blade, and the blade is removed from the ball.

Handle 14 may be formed from any durable material. In an embodiment of the inventive dog toy, handle 14 constitutes a flexible strap. Referring to FIGS. 1 and 2, a preferred embodiment of the flexible strap is formed of a flat, hypoallergenic, colorfast nylon fabric, as nylon is durable, comfortable, and inexpensive. Ends 24 and 26 of the strap 14 may then be fixed to each other by sewing them together. Joinder point 30 can similarly be formed by sewing. However, it should be understood that other materials including, but not limited to, plastics, cotton or leather could also be used.

Referring to FIG. 3, in an alternative embodiment of handle 14, a section of synthetic fiber rope that is fusible by heat is used. Ropes suitable for this purpose include, but are not limited to, braided nylon ropes. Ends 24 and 26 of the synthetic fiber rope may be fixed to each other at joinder point 28 by heating them until partially melted and then fusing them together. Joinder point 30 can be created by knotting the synthetic fiber rope close to ball 12. One or more further joinder points 32 can easily be formed in handle 14 by the user by creating more knots. In any handle embodiment, a foam grip 34 may be fitted over handle 14 as shown in FIG. 4 if desired for the user's comfort.

Referring to FIG. 5, the inventive ball toy can include one or more additional balls 36 fitted upon handle 14. Each additional ball 36 has a hollow interior cavity (not shown) and two openings 38 and 40 into the hollow interior cavity. Handle 14 extends through each additional ball 36, passing into the hollow interior cavity through one opening 38 and out from the other opening 40.

Handle 14 may be passed into and out of any opening into the hollow cavity of any ball more than once, and more than one looped structure may be formed in handle 14 extending away from each ball. Additional openings may be formed in one or more balls in order to accommodate these looped structures. Referring to FIG. 6, an embodiment of the ball toy is shown wherein the ball 12 forms four openings 60, 62, 64, and 66. Handle 14 is passed both into and out from each opening 60, 62, 64, and 66, and formed into four loops 70, 72, 74 and 76, one extending from each opening. A joinder point 80, 82, 84, or 86 is made at the base of each loop 70, 72, 74 and 76 to fix the loop in position. Ends 24 and 26 of handle 14 and joinder point 28 are positioned within the hollow interior cavity of ball 12.

Referring to FIG. 7, an embodiment of the ball toy is shown wherein two balls 12 and 36 are used. Handle 14 passes out from the interior of ball 12 through opening 20 and into ball 36 through opening 38. Handle 14 exits ball 36 from opening 40, is looped about and fixed to itself at a joinder point 90 proximate to opening 40, forming loop 92. Handle 14 then passes back through ball 36, entering opening 40 and exiting opening 38, and passes into ball 12 back through opening 20. Handle 14 then exits ball 12 through opening 22 and is looped about and fixed to itself at a joinder point 94 proximate to opening 22, forming loop 96. Handle 14 then passes back into ball 12 through opening 22. Ends 24 and 26 of ball 12 are fixed together at joinder point 28 within ball 12.

Similarly, the inventive ball toy can include one or more additional handles (not shown) passed through any ball. Additional openings are preferably made in each ball having an additional handle or handles to accommodate the passage of the additional handle or handles.

Referring to FIG. 3, a rattling object 33 may be placed within the ball or balls used in the inventive ball toy for the further enjoyment of the dog and the user.

Although the foregoing invention has been described in some detail by way of illustration for purposes of clarity of understanding, it will be readily apparent to those of ordinary skill in the art in light of the teachings of this invention that certain changes and modifications may be made thereto without departing from the spirit or scope of the appended claims.

It is claimed:

1. A ball toy, comprising:
a primary ball having a hollow interior cavity and an outer surface defining a first opening and a second opening into said hollow interior cavity;
a primary handle formed into a continuous loop, said handle entering said hollow interior cavity through the first opening in the outer surface of said primary ball, and exiting from said hollow interior cavity through the second opening in the outer surface of said primary ball such that said primary handle passes only once through said first opening and said second opening.

2. The ball toy of claim 1 wherein said first opening is diametrically opposed to said second opening.

3. The ball toy of claim 2 wherein said primary handle is fixed to itself at a joinder point external to said primary ball and adjacent said outer surface of said primary ball.

4. The ball toy of claim 3, further comprising at least one secondary ball, said primary handle passing through each said secondary ball.

5. The ball toy of claim 4 wherein said primary ball and each secondary ball is a tennis ball.

6. The ball toy of claim 5 wherein said primary handle both enters into and exits from at least one of said openings into the hollow interior cavity of one or more of said secondary balls, said handle forming a loop at each said at least one opening extending away from that opening.

7. The ball toy of claim 5 further comprising one or more additional handles passing through one or more of said primary ball and secondary balls.

8. The ball toy of claim 7 further comprising at least two additional openings into the hollow interior cavity of said primary ball and wherein each of said additional handles passes into said hollow interior cavity of said primary ball through one of said additional openings and out from said hollow interior cavity of said primary ball through another said additional opening.

9. The ball toy of claim 8 wherein the hollow interior cavity of the primary and each secondary ball encloses a rattling object.

10. A method for making a ball toy for dogs, said ball toy comprising a primary ball having a hollow interior cavity and an outer surface defining a first opening and a second opening into said hollow interior cavity and a handle having two ends, said handle formed into a continuous loop entering said hollow interior cavity through said first opening and exiting said hollow interior cavity through said second opening such that it passes only once through said first opening and said second opening, comprising the steps of:

forming two openings into said hollow interior cavity of said primary ball, said openings having sufficient size to accommodate the passage of said two ends of said handle when said two ends are fixed together;

fitting said handle through said hollow interior cavity of said primary ball by inserting one of said ends of said handle through one of said openings and pulling that end through the other of said openings; and fixing together said two ends of said handle at a position exterior to said primary ball, thereby forming said handle into a loops said handle passing only once through each opening.

11. The method of claim 10 wherein the step of fitting the handle through the hollow interior cavity includes the following steps:

fixing rigid threading means detachably to one of the ends of said handle;

threading said rigid threading means through one of said openings, through said hollow interior cavity, and through the other said opening;

pulling the end of the handle fixed to said rigid threading means through one of said openings, through said hollow interior cavity, and through the other said opening, by moving said rigid threading means in relation to said primary ball; and detaching said rigid threading means from said end of said handle.

* * * * *